United States Patent
Spence

[15] 3,689,101
[45] Sept. 5, 1972

[54] SWIVELLING WHEEL SUSPENSION FOR VEHICLE

[72] Inventor: William George Spence, 2372 Wilson Ave. Apt. 8, Montreal 260, Quebec, Canada

[22] Filed: Sept. 1, 1970

[21] Appl. No.: 68,618

[52] U.S. Cl. ............ 280/96.2 R, 16/44, 180/43 R, 280/92, 280/124 A
[51] Int. Cl. .............................................. B60g 3/00
[58] Field of Search .......... 16/44; 280/96.2 R, 78, 92, 280/124 A; 180/30, 31, 26, 43

[56] References Cited

UNITED STATES PATENTS

| | | | |
|---|---|---|---|
| 1,422,671 | 7/1922 | Cochran | 280/92 |
| 2,271,304 | 1/1942 | Mulholland | 16/44 |
| 2,472,686 | 6/1949 | Snyder | 16/44 |
| 2,515,704 | 7/1950 | Gardiner | 16/44 |

*Primary Examiner*—A. Harry Levy
*Attorney*—Pierre Lesperance

[57] ABSTRACT

A wheel suspension arranged to support a driven wheel for swivelling movement in a horizontal plane and in a vertical plane whereby a vehicle may be mounted on a number of wheels to provide independent driving, steering and suspension of the wheels. A swivelling wheel suspension comprising a pivot member arranged to be pivotally mounted in an upright position to provide swivelling in a horizontal plane, a spring biased lever arm pivotally mounted relative to the pivot member to provide swivelling in a vertical plane of a wheel carried in upright position by the lever arm, driving shafts and gears for the associated wheel, and steering means to swivel the pivot member.

5 Claims, 6 Drawing Figures

PATENTED SEP 5 1972

INVENTOR
William George SPENCE
BY  Pierre Lespérance
                    AGENT

PATENTED SEP 5 1972 3,689,101

INVENTOR
William George SPENCE
BY Pierre Lespérance
AGENT

SWIVELLING WHEEL SUSPENSION FOR VEHICLE

This invention relates to an independent wheel suspension and, more particularly, to a wheel suspension for a driven wheel of a motor vehicle.

It is a general object of this invention to provide a wheel suspension arranged for driving, steering and suspension of a road wheel of a vehicle, whereby the associated wheel will be allowed swivelling in a horizontal plane and in a vertical plane.

It is another object of the invention to provide a wheel vehicle with any number of wheels attached to individual wheel suspensions which are arranged to allow independent driving, steering and suspension of the wheels.

It is another object of the invention to provide a wheel suspension having a spring biased lever arm adapted to mount a road wheel in upright position wherein the biasing force of the spring can be adjusted.

The present invention defines a swivelling wheel suspension simply and in combination with a vehicle having an upright pivot bearing means, said swivelling wheel suspension comprising a pivot member adapted to be rotatably mounted in upright position onto said upright pivot bearing means, a pivot means having a pivot axis both extending transversely away from said pivot member, a lever arm mounted on said pivot means and defining a free end spaced radially from the latter, said lever arm being rotatable about said pivot axis, a wheel axle mounted on said free end of said lever arm and adapted to hold a wheel in an upright plane when the suspension is mounted in normal operative position, and spring means connected to said lever arm, whereby the latter is arranged for up-and-down springing movement about said pivot axis under the bias of said spring means when said suspension is held in normal operative position.

The invention will now be described, by way of example only, with reference to the two embodiments shown in the accompanying drawings, in which.

Figure 1:
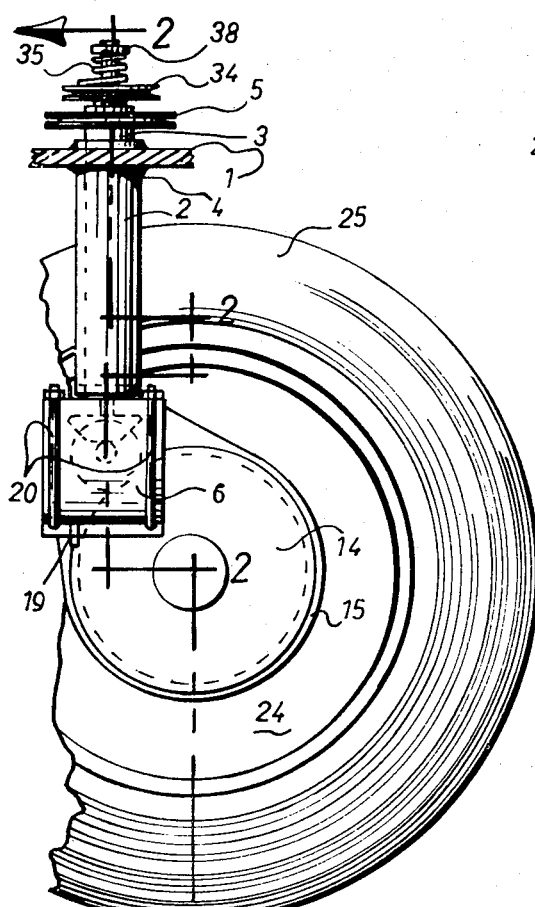
FIG. 1 is a side elevation view of a first embodiment of a swivelling wheel suspension and an associated wheel in normal operative position according to the invention.
Figure 2:
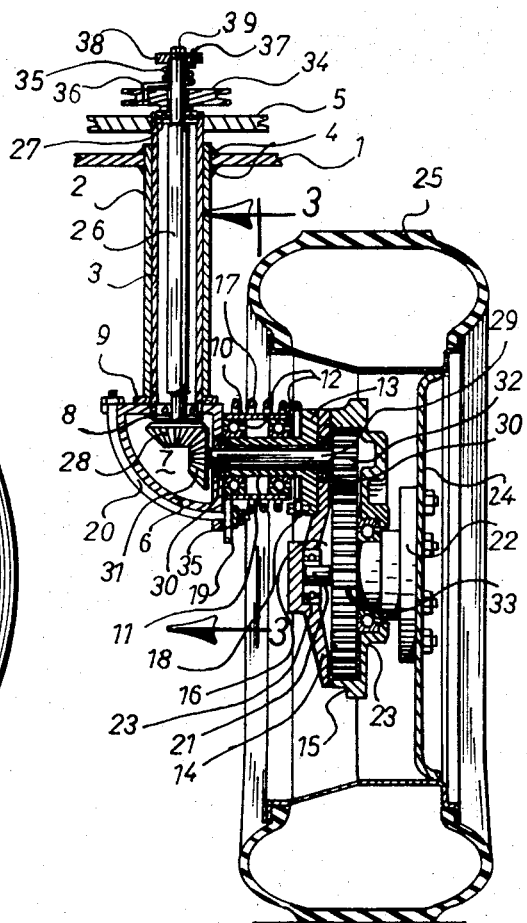
FIG. 2 is a cross-sectional view as seen in the direction of the arrows along line 2—2 in FIG. 1.

Referring to the drawings in detail, the swivelling wheel suspension is shown mounted on a normally horizontal plate 1 defining part of the frame structure of a vehicle. A vertical tube 2 forms an upright pivot bearing for a tubular pivot member 3 to pivotally support the latter. The vertical tube 2 is preferably welded at 4 to a horizontal plate 1 to be rigidly fixed thereto. Obviously, the vertical tube 2 could be fixed relative to the frame of a vehicle in a different manner, by welding, bolting or the like, such as against a vertical plate or member of the frame. The vertical tube 2 can be replaced by other known or equivalent elements suitable to support a tubular pivot member in an upright or vertical position. A pulley 5 is fixed on the upper end of the tubular pivot member 3 for rotation therewith.

The lower end of the tubular pivot member 3 projects through an opening in the top wall of a housing 6 defining a gear chamber 7 and is fixed to the housing 6 by welding 8, or the like, such as bolting. A ring element 9 is mounted between the lower end of the vertical tube 2 and the top surface of the housing 6 to control the axial thrust of the suspension.

Referring now particularly to FIGS. 1 to 4 inclusive, a sleeve 10 is fixed edgewise against a side wall of the housing 6 and extends therefrom transversely radially relative to the vertical tube or upright pivot bearing 2.

A tubular pivot element 11 extends inside the sleeve 10 and is rotatably retained concentric thereto by a pair of thrust bearings 12. The tubular pivot element 11 has an outer flange 13 against which is fixed a hollow lever arm or beam formed by a pair of complementary plates 14 and 15 constructed and arranged to define a housing having a gear chamber 16, the upper end of the plate 14 being fixed against the flange 13 to bodily pivot therewith.

A torsion spring 17 is mounted around the sleeve 10 and has its outer end fixed by a bolt or screw 18 to the flange 13 of the tubular pivot element 11 and has its inner end 19 restrained by one end of one of two bolts 20 fixed to wall extensions of the housing 6.

Figure 3:
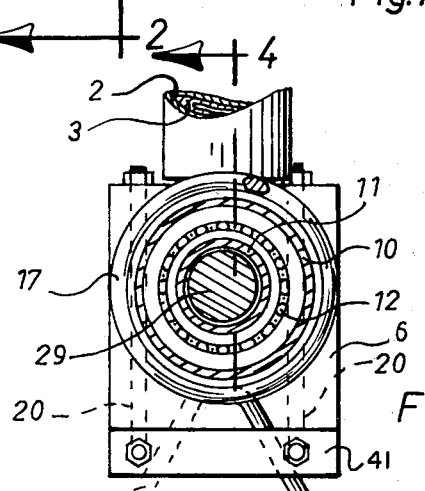
FIG. 3 is a cross-sectional view as seen in the direction of the arrows along line 3—3 in FIG. 2.
Figure 4:
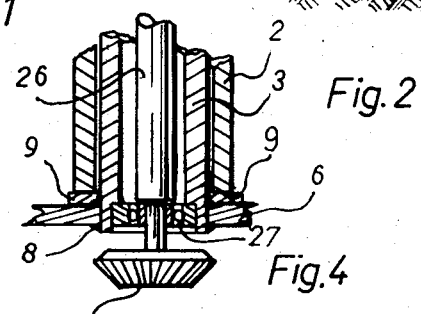
FIG. 4 is a partial cross-sectional view as seen in the direction of the arrows along line 4—4 in FIG. 3.

The end 19 of the torsion spring 17 may merely abut against the end of one bolt 20, as shown in FIG. 3, or may be bent around the end of the bolt. It must be appreciated that the same wheel and the supporting lever arm combination is constructed to be positioned on the left as well as on the right of a vehicle and the end 19 of the torsion spring 17 will correspondingly abut either one or the other of the two bolts 20, and in either position will hence provide biasing of the lever arm.

A wheel axle 21 with a flange 22 is rotatably mounted by a pair of bearings 23 on the lower or free end of the lever arm defined by the complementary plates 14 and 15. A wheel hub 24 is fixed on the flange 22 and a tire 25 is mounted on the wheel hub 24.

The driving links for the wheel axle 21 includes a shaft 26 extending axially inside the tubular pivot member 3 and supported therein by bearings 27 fixed inside the tubular pivot member at the opposite ends thereof. A bevel gear 28 is fixed on the lower end of the shaft 26. A shaft 29 extends axially inside the tubular pivot 11 by bearings 30 fixed at the opposite ends of the shaft 29. A bevel gear 31 is fixed on one end of the shaft 29 which extends into the chamber 7 and is arranged to mesh with the bevel gear 28. A pinion 32 is fixed on the outer end of the shaft 29 which extends inside the chamber 16 of the lever arm. A gear 33 is fixed on the wheel axle 21 in meshing engagement with the pinion 32 such that rotation of the shaft 26 will cause rotation of the wheel axle 21 and the wheel carried thereon.

During normal operation, when the gear 33 rotates and the wheel hits a hole or a bump, a resulting angular speed differential induces a force on the driving links, including the upright shaft 26, counteracting the driving force on the shaft 26. In order to minimize the impact of the speed differential on the driving links, the upright shaft 26 is driven by a resiliently mounted pulley 34. The latter is freely mounted on the upper end of the upright shaft 26. A torsion spring 35 is inserted around the shaft 26. One end 36 of the torsion spring 35 is fixed to the pulley 34 and the other end 37 of the torsion spring 35 is fixed to an abutment disc 38 fixed against the end of the upright shaft 26 by a screw 39 and a key 40 or any other convenient and equivalent expedient.

It can be seen that, when an angular speed differential is transmitted to the upright shaft 26, the induced force will be transmitted by the disc 38 to the torsion spring 35 where it will be at least partially absorbed. Hence, none or little induced force will be transmitted to the driving pulley 34 upon springing movement of the wheel.

Figure 5:
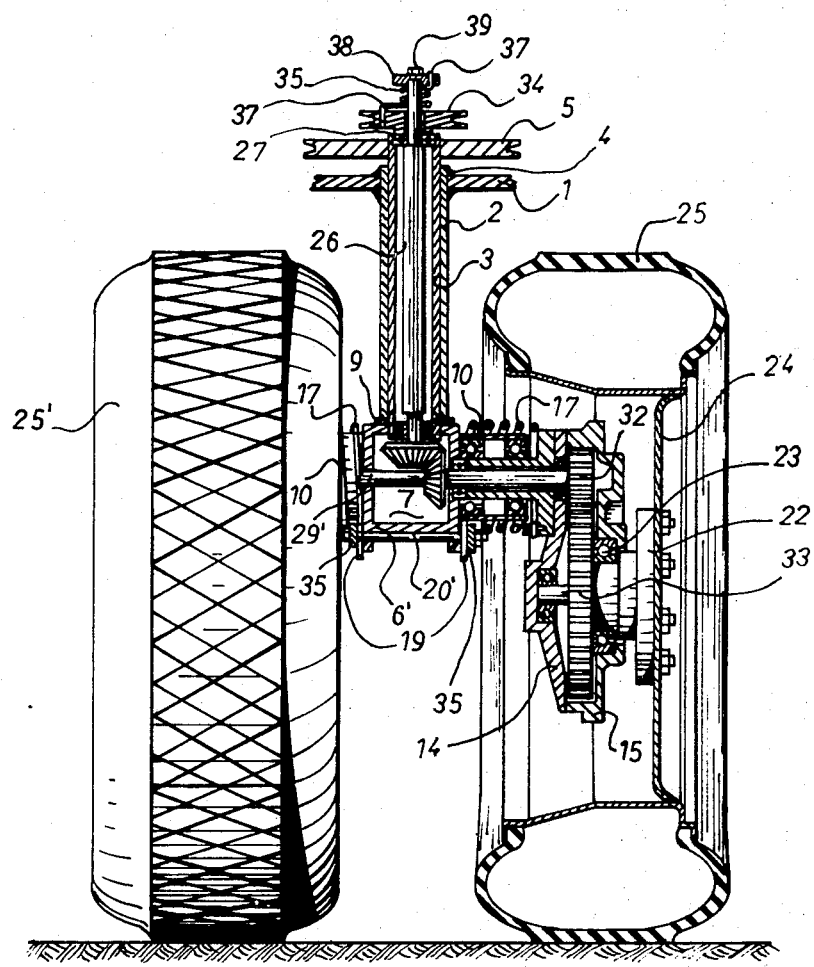
FIG. 5 is a generally cross-sectional view corresponding to the view of FIG. 2, showing a second embodiment of the invention.
Figure 6:
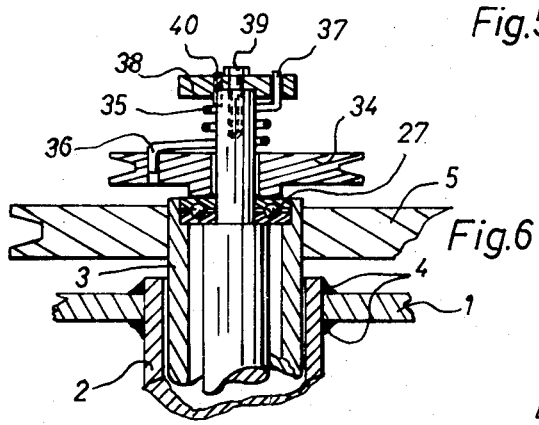
FIG. 6 is an enlarged view of the upper portion of the swivelling wheel suspension, as shown in FIGS. 2 and 5.

The second embodiment of the invention, illustrated in FIG. 5, consists in a dual wheel assembly which includes all the elements as in the first embodiment with some differences as hereafter described. The gear chamber is defined by a housing 6', of generally square or rectangular configuration. A transverse shaft 29' extends through the tubular pivot element 11 on opposite sides of the housing 6'. The tire 25', on the left-hand side of the dual wheel assembly, is supported, driven and steered by a similar mechanism as the one described in relation to FIG. 2 and, therefore, is not shown nor described in detail.

It must be appreciated that each wheel is individually supported and sprung for improved performance. Bolts 20' extend along the undersurface of the housing 6' between downward extensions thereof to provide stops for the end 19 of each torsion spring 17. In both embodiments of the invention, a plate 41 is held in spaced-apart relationship relative to the housing 6 or 6' to define a slot for the displacement of the end 19 of each torsion spring 17.

It will be readily understood that the steering is produced by rotation of the pulley 5 fixed onto the tubular pivot member 3, causing rotation of the latter about its longitudinal axis. The housing 6 or 6' fixed to the pivot member 3 rotates with the latter, causing swivelling of the associated tubular pivot lement 11, lever arm and wheel in a horizontal plane around the longitudinal axis of the pivot member 3.

As explained earlier, the torsion springs 17 provide independent springing of each associated wheel in a vertical plane. The two stops or abutments defined by the bolts 20 or 20' allow positioning of the wheel either forward or rearward of the tubular pivot element 29 or 29'.

Driving of each wheel is produced by rotation of the pulley 34 which twists the connected torsion spring 35, preferably within its elastic limit, such as to transmit the driving force to the upright shaft 26 through the torsion spring 35 while retaining a sufficient elastic range in the latter to absorb the above-mentioned induced force.

It must be appreciated that swivelling wheel suspensions according to the invention may be mounted under a vehicle such that the latter will be supported by a set of wheels which are adopted to be independently steered, suspended and driven, such vehicle being applicable for off-highway use, for instance as a so-called dune buggy or the like.

It will be noted that in order to locate the driving train for the wheels inside the suspension system, the pivot member 2, the pivot means 10 and the lever arm 14,15 must be hollow and communicate with each other. Also, because the wheels are driving wheels, they must be arranged in a rotational plane which is horizontally offset from the vertical pivot member and pivot means therefor, namely: members 1 and 2; and also, the transversely extending axis of the pivot means 10 and, consequently, of the transverse shaft 29 intersect with the upright pivot axis of pivot member 3. Despite this offset relationship, the single wheel embodiment of FIGS. 1 to 4 can be mounted on the left-hand or right-hand side of a vehicle, with the wheel always on the outside of the pivot member 3 and trailing said pivot member. Thus, depending on whether the wheel suspension system is mounted on the left-hand or right-hand side of the vehicle, the lever arm 14,15 will be rotated in opposite direction with respect to the vertical passing through the pivot member 3. Thus, the lever arm 14,15 may rotate in both directions of rotation about the transverse extending axis and the spring means 17 can act in both directions of rotation to bias the lever arm in either one of its two normal positions. In said two normal positions, the line joining the wheel axle axis to the transversely extending pivot axis is inclined in either side of the upright pivot axis.

I claim:

1. A swiveling wheel suspension adapted to be mounted on the left-hand or right-hand side of a vehicle, comprising a pivot bearing means adapted to be fixed to said vehicle under one side thereof and defining an upright pivot axis, a pivot member rotatably mounted in said upright pivot bearing means for rotation about said upright pivot axis, a pivot means carried by the lower end of said pivot member and having a pivot axis both extending away from said pivot member transversely of said upright pivot axis, the later axis intersecting the pivot axis of said pivot means, a lever arm mounted on said pivot means and defining a free end spaced radially from the latter, said lever arm being rotatable about said transversely extending pivot axis in an upright plane horizontally offset from said upright pivot axis, a wheel axle mounted on said free end of said lever arm, having its axis parallel to and spaced from said transversely extending pivot axis and adapted to hold the wheel in an upright plane horizontally offset from said upright pivot axis, said lever arm capable of taking two normal positions with the line joining the wheel axle axis to the transversely extending pivot axis, inclined on either side of said upright pivot axis, and spring means connected to said lever arm and to said pivot means and biasing said lever arm in both directions of rotation of said lever arm about said transversely extending axis, whereby said spring means are arranged to bias said lever arm downwardly in either of the normal positions of said lever arm, whereby said swiveling wheel suspension can be mounted on the left-hand or right-hand side of a vehicle with the wheel on the outside of the pivot member and with the wheel axle trailing said pivot member.

2. A swiveling wheel suspension as claimed in claim 1, wherein said pivot member, pivot means and lever arm are hollow and communicate with each other, said wheel axle extending through said hollow lever arm and said pivot member being open at its upper end.

3. A swiveling wheel suspension as claimed in claim 2, wherein said spring means is a torsion spring positioned around said pivot means and having one end secured to said lever arm and the other end engageable with either one of a pair of mutually facing abutments carried by said pivot member.

4. A swiveling wheel suspension as claimed in claim 3, further including a tire wheel mounted on said wheel axle with the tire of said wheel surrounding and overlapping said lever arm.

5. A wheel vehicle comprising a frame, an upright pivot bearing member fixed to said frame under one side of the same, an upright tubular pivot member rotatably mounted within said pivot bearing member for rotation about an upright pivot axis, a second pivot member carried by the lower end of said first pivot member extending horizontally laterally therefrom and being tubular, a hollow lever arm mounted on said second tubular pivot member for rotation in a vertical plane horizontally offset from said pivot bearing member, said lever arm being freely rotatable about said second pivot member and defining a free end spaced radially from the axis of said second pivot member, a wheel axle mounted on the free end of said lever arm, a road wheel mounted on said wheel axle for rotation in a plane parallel to and horizontally offset from the said pivot bearing member, said road wheel including a rim and a tire surrounding and overlapping said lever arm and said second pivot member, said first and second pivot members and said lever arm being in communication with one another, and spring means biasing said lever arm against both its directions of rotation.

* * * * *